Jan. 3, 1961  C W. MUSSER  2,967,070
COLLAR AND SHAFT
Filed March 28, 1958
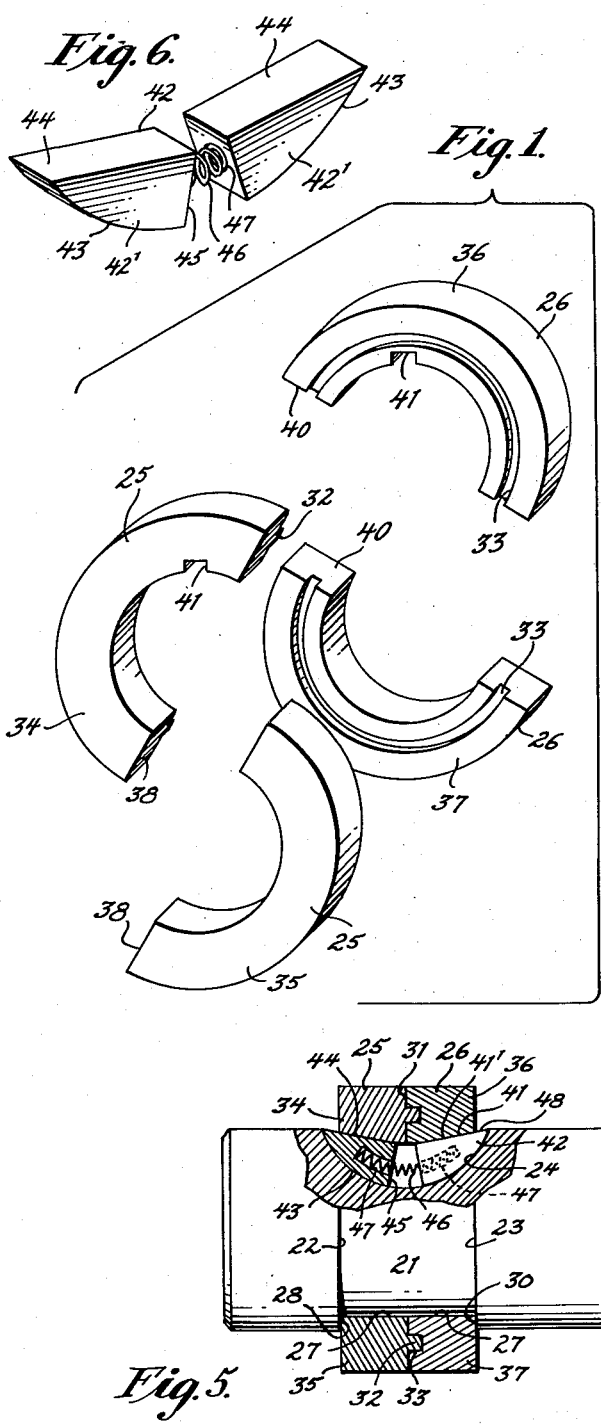
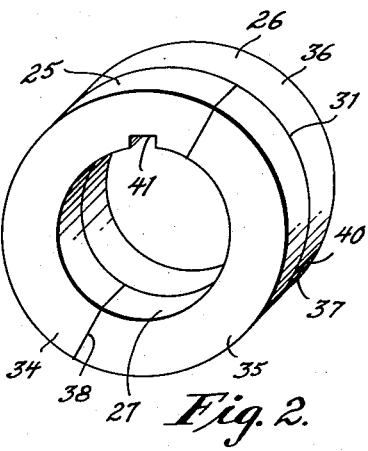
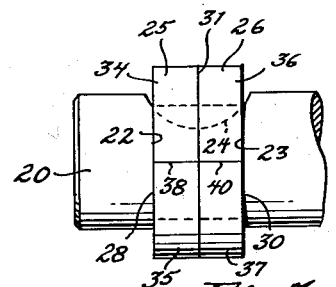
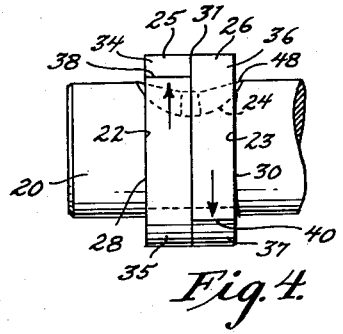
INVENTOR
C WALTON MUSSER
BY
ATTORNEYS United States Patent Office 2,967,070
Patented Jan. 3, 1961

2,967,070
COLLAR AND SHAFT
C Walton Musser, 66 McKay St., Beverly, Mass.
Filed Mar. 28, 1958, Ser. No. 724,650
12 Claims. (Cl. 287—52.03)

The present invention relates to a collar of the character which is used on a shaft, and to shaft and collar combinations.

When reference is made herein to a collar it is intended to designate generally any machine element of this general character, it being understood that the collar may in fact form the hub or body portion of some other machine element, for example, a gear, pulley, crank, lever, or the like.

A purpose of the invention is to place a collar on a shaft without removing the shaft from its bearings and without taking off other elements which may be mounted on the shaft.

A further purpose is to permit ready replacement of a collar on the shaft without moving the collar endwise with respect to the shaft.

A further purpose is to facilitate changing the collar character, such as the diameter, or to facilitate replacing one machine element for another on the shaft.

A further purpose is to permit fabrication of equipment with auxiliary mounting arrangements which can subsequently be used to add other equipment without disassembly of the shaft.

A further purpose is to form a collar from collar elements which are axially separate but which are annularly interlocked, to lock the collar elements axially as by shoulders on the shaft, and to remove and replace the collar elements by bringing the segmental separation lines of segments making up the collar elements into coincidence and then later separating the segments.

A further purpose is to lock the segments by means of a key, desirably utilizing a key of segmental portions which are urged apart by a spring, and which in locking position fit both in a key seat of the shaft and a keyway of the collar.

A further purpose is to permit manufacture of collars on shafts without the waste of materials and workmanship in turning down large diameters in order to leave integral collars.

A further purpose is to permit forming a shaft from stock having the normal shaft diameter without requiring extra machining.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1 is an exploded perspective of the collar of the invention.

Figure 2 is a perspective of the collar of Figure 1 which has been assembled, but not placed on a shaft.

Figure 3 is a side elevation showing a collar assembled on the shaft in the position achieved when the segments are first radially brought together but before they are rotated.

Figure 4 is a view similar to Figure 3 showing the collar elements after they have been rotated.

Figure 5 is a fragmentary axial section of the shaft and collar combination at the keyway when the collar is locked.

Figure 6 is a perspective of a key useful in the present invention.

Describing in illustration but not in limitation and referring to the drawings:

In the prior practice in making shafts provided with collars, it has been very common to machine stock, having the full diameter of the collar, down to the shaft size to make an integral collar on the shaft. Because of the amount of machining and the amount of stock which is removed in machining, this is very wasteful. It also leads to design limitations, since often heat treatment of the shaft is not practical, and therefore it is necessary to use relatively soft components for the collar. Even where removable collars are employed, secured, for example, by set screws, wedges, pins or keys, the installation and removal is subject to the limitation that the collar must slide endwise to one end or the other of the shaft, and therefore installation requires ordinarily that the shaft be removed from its bearings and that components on the shaft beyond the collar location must be taken off.

The present invention is designed to provide a collar which is readily assembled on a shaft which is already mounted on its bearings and which is readily removable from such shaft without taking the shaft out of its bearings and without removing other machine elements. This permits using stock sizes of the ultimate stock diameter in making the shaft. The design of the collar and its choice of material is entirely independent of the design of the shaft, and relatively stronger materials can be used for the collar if desired. The collar can be installed or removed readily, and this permits accessories or supplemental components to be added to existing machinery.

Considering now the drawings in detail, I illustrate a shaft 20 of any suitable material, such as steel, which at the collar location has a circular portion 21 of reduced diameter which connects with the portions of larger diameters at both ends by opposed shoulders 22 and 23. It will be evident that while relatively sharp shoulders are shown, the designer may prefer filleting of the shoulders in line with well known principles.

It will also be evident that while the shoulders are provided integral with the shaft in the illustration shown in the drawings, the shoulders may, if desired, be formed by auxiliary collars which are suitably placed one on each side of the collar of the present invention. Where auxiliary collars are used, it will of course be understood that suitable provision for access to the key as later explained will be provided.

At the position between the shoulders 22 and 23, I provide a longitudinal key seat 24, which as shown is desirably of arcuate contour in longitudinal section conforming suitably to the standard Woodruff key seat design. The slot for the key seat in transverse section is suitably rectangular to fit the key with slight clearance, as well known. The length of the key seat is desirably somewhat longer than the distance between the shoulders, so that access beyond the collar to retract the key can be provided, as later explained.

The removable collar of the present invention comprises collar elements 25 and 26, each of which extends completely around the shaft and each of which has an interior shaft opening 27 which conforms to the reduced diameter of the shaft at 21. The collar elements 25 and 26 are displaced axially, one of them engaging the shoulder 22 at 28 at one end and the other engaging the shoulder 23 at 30 at the other end. The collar elements meet at the center in abutting relationship at 31, an interlock due to an annular tongue 32 at the abutting face extending from the collar element 25 into an annular groove 33 at the abutting face on the collar element 26. The fit in the tongue and groove is desirably close so that relative radial motion between elements is reasonably avoided.

The collar element 25 is made up of two segments 34 and 35 and the collar element 26 is made up of two segments 36 and 37 so that it will be evident that half of the annular tongue is on one of the segments 34 and the other half is on the other segment 35 and half of the annular groove is on one of the segments 36 and the other half is on the other segment 37.

Each of the segments in the form shown is a segmental half, and the segments join along radial abutting edges 38 for segments 34 and 35, and 40 for segments 36 and 37.

It will be evident, however, that where desired, more than two segments can be used in forming a collar element providing the total of the segments form a complete circumference.

The collar elements are locked in assembled relation by a suitable key which engages in keyways 41 which are formed in segment 34 of one collar element and in segment 36 of the other collar element. The keyways in locking position must align circumferentially and longitudinally with key seat 24.

While other suitable keys may be used, it is preferable to employ the key 42 of the present invention, which comprises two arcuate key segments 42', each of which has an arcuate surface 43, which fits the curvature of the key seat 24, and a radial surface 44 which in locking position fits an oppositely tapering inner surface 41' of keyway 41. Also key segments 42' each have a radial surface 45 which permits sufficient freedom or space between the two segments in locking position so that the segments can be retracted toward one another against the action of a helical compression spring 46 to remove the collar. The helical compression spring 46 in the form shown seats in spring engaging recesses 47 of the segments.

In the form shown, the keyway 41 of the collar tapers radially outward in both directions from a longitudinal midpoint and in locking position as shown in Figure 5 radial surface 44 engages the tapered surface 41' of the keyway so that the segments of the key have moved slightly beyond the 180 degree position. This permits the ends of the segments at 48 to be at or slightly below the level of the larger diameter of the shaft in order that a suitable instrument may be inserted to retract the segments or force one of them arcuately toward the other in order to disassemble the device.

In operation, in order to assemble the collar, having provided the shoulders 22 and 23 on the shaft and the shaft surface 21 on which the collar is to seat, and having provided the key seat 24 in the shaft, the key is placed in position. Collar segment 34 and collar segment 36 are engaged at the tongue and groove interlock and their radial termination surfaces 38 and 40 are brought circumferentially into line as shown in Figure 3. Likewise, collar segments 35 and 37 are interlocked at the tongue and groove with their radial terminations 38 adn 40 in line as in Figure 3.

The segments 34, 36 and 35, 37 are then brought radially into position and seated around the shaft portion 21 against the opposed shoulder 22, 23. This will have the tendency to retract the key against the action of the spring since the keyway 44 will not be in line with the key seat. With the segments now assembled on the shaft, the collar elements are relatively rotated, as suggested by the arrows in Figure 4, until the junctures of the segments of one collar element are suitably 90° out of phase with the junctures of the other collar elements.

With the relative angular relationships established between the segments in the collar elements, the collar elements bodily in their same relation are turned angularly around the shaft until the keyways 41 on segments 34 and 36 align relatively with the key seat in the shaft, at which time the key segments 42', under the action of the spring, snap into locking relationship, as shown in Figure 5.

The collar is now completely assembled on the shaft.

It will be evident, of course, that if the fit is tight enough or the collar elements are large enough, suitable provision may be made for wrenches to accomplish the rotation of the segments, as by making spanner openings in one or more segments or by providing flats or recesses for wrench engagement on the segments.

In order to disassemble, a suitable tool is applied to one of the key segments at the point 48, rotating it about the center of arc 24 and forcing it out of the collar keyway at one side. It is then possible to rotate the corresponding collar element until its collar segments have the same termination as the collar segments in the adjoining collar element. At this position then, the collar can be separated radially, moving the collar segments 34 and 36 radially with respect to the collar segments 35 and 37. The key can then be removed and any suitable modification made in the collar assembly.

While the collar as shown in the drawings of the present invention is made up of two collar elements, it will be evident that any suitable number may be used where desired.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a shaft and collar assembly, a shaft having a circular portion of reduced diameter and having portions of larger diameter at both ends, with connecting shoulders and a collar comprising a collar body having a shaft opening which fits around the reduced circular portion of the shaft, the collar body including first and second collar elements at different axial positions which engage one another and have the same inner diameter, there being in each of the collar elements a plurality of separable segments, each of the collar elements having circular interlock means which extend axially and engage circular interlock means on the other collar element, each of the collar elements at one axial position engaging one of the connecting shoulders, the collar elements being rotatable with respect to one another and having at least two different positions of rotation, in one of which positions of rotation the radial separation of the segments of each of the collar elements being in alignment and in another of the rotational positions the radial separation of the segments of the two collar elements being out of alignment.

2. A shaft and collar assembly of claim 1, in combination with means acting between the shaft and the collar for locking the mutually cooperating segments of the first collar element and the mutually cooperating segments of the second collar element in a relative rotational position to one another in which the radial separations of the segments of the first and second collar elements are not in rotational alignment to one another.

3. A shaft and collar assembly of claim 1, in combination with a keyway extending axially through a segment of the first collar element and through a segment of the second collar element, the radial separations of the segments of the first and second collar elements being in different rotational positions, and key means in the keyway for locking the segments.

4. In a shaft and collar assembly, a shaft having a portion of reduced circular diameter and having shoulders at the opposite ends thereof, and a collar fitting around the portion of the shaft of reduced circular diameter and engaging the shoulders at the ends, the collar consisting of two collar elements in different axial positions which abut axially against one another, each of the collar elements consisting of two segmental halves provided with a shaft opening, each segmental half having at the side adjoining the opposite collar element annular interlock means which engages with annular interlock means on the other collar element, a key seat extending axially of the reduced portion of the shaft, a keyway extending axially of one segmental half of each collar element and a key in the key seat and keyway, the segmental halves being aligned when the key is in place so that the radial separations of the segmental halves of the two collar elements are not in rotational alignment.

5. In a shaft and collar assembly, a shaft having a portion of reduced diameter, and having shoulders at the ends of the portion of reduced diameter, which shoulders face toward one another, a key seat extending axially in the shaft portion of reduced diameter, a collar surrounding the shaft engaging the portion of reduced diameter and at its two sides seating against the shoulders, the collar having a plurality of axially displaced and adjoining collar elements and having on each of the collar elements annular interlock means which interengages with annular interlock means on an adjoining collar element, each of the collar elements comprising a plurality of segments which have radial separations, a keyway in the collar elements which aligns with the key seat in the shaft, the radial separations of the segments of the different collar elements being out of line with one another, and key means extending into the key seat and into the keyway, the key means in one position being disposed entirely within the diameter of the portion of the shaft of reduced diameter, and said key means in another position holding the collar elements against rotation bodily.

6. A shaft and collar assembly of claim 5, in which the key seat has an arcuate bottom contour and in which the key means comprises a plurality of segments having arcuate surfaces engaging the arcuate surfaces of the key seat, and means urging the segments apart.

7. A shaft and collar assembly of claim 6, in which the keyway tapers endwise in both directions from a mid-position and in which radial portions of the segments engage the tapering surfaces of the keyway.

8. A shaft and collar assembly comprising a shaft having a portion of reduced diameter and axially facing shoulders at opposite ends of said portion, a key seat of Woodruff type extending axially in the shaft at the portion of reduced diameter, a first pair of cooperating segmental collar halves engaging the shoulder at one end and surrounding and engaging the portion of the shaft at reduced diameter, the first pair of segmental halves being provided with an annular tongue extending toward the opposite shoulder, a second pair of cooperating segmental collar halves engaging the first pair and engaging the opposite shoulder and surrounding and engaging the reduced portion of the shaft, the second pair of segmental collar halves having an annular groove which receives the annular tongue on the first pair, a keyway in one of the segments of the first pair, a keyway in one of the segments of the second pair, said keyways being in alignment with the key seat in the shaft, the radial separations of the segments of the first and the second pair being out of line, and a key extending through the keyway and the key seats and locking the collar segments against rotation.

9. A shaft and collar assembly of claim 8, in which the key comprises arcuate key segments, and spring means urging the key segments relatively apart.

10. A shaft and collar assembly of claim 9, in which the key segments extend axially beyond the collar and are accessible for engagement or retraction beyond the collar.

11. A shaft and collar assembly of claim 9, in which the keyway in the collar segments tapers in each axial direction, and the key segments in locking position engage the tapering portion of the keyway.

12. In a shaft and collar assembly, a shaft having a circular portion of reduced diameter and having portions of larger diameter at both ends which join the portion of reduced diameter by shoulders, in combination with a collar surrounding and engaging the portion of reduced diameter and engaging endwise against the shoulders, the collar being formed of a group of first mutually cooperating segments having a shaft opening and having at one side an annular tongue, a group of second mutually cooperating segments having a shaft opening of the same size as the shaft openings of the first segments and having at one side an annular groove, the annular tongue of one set of segments extending into and locking in the annular groove of the other set of segments, and the segments of the two sets being relatively rotatable with respect to one another.

References Cited in the file of this patent

UNITED STATES PATENTS

| | | |
|---|---|---|
| 216,338 | Morgan | June 10, 1879 |
| 368,744 | Woodruff | Aug. 23, 1887 |
| 857,862 | Best | June 25, 1907 |
| 1,201,706 | Dodge | Oct. 17, 1916 |